UNITED STATES PATENT OFFICE.

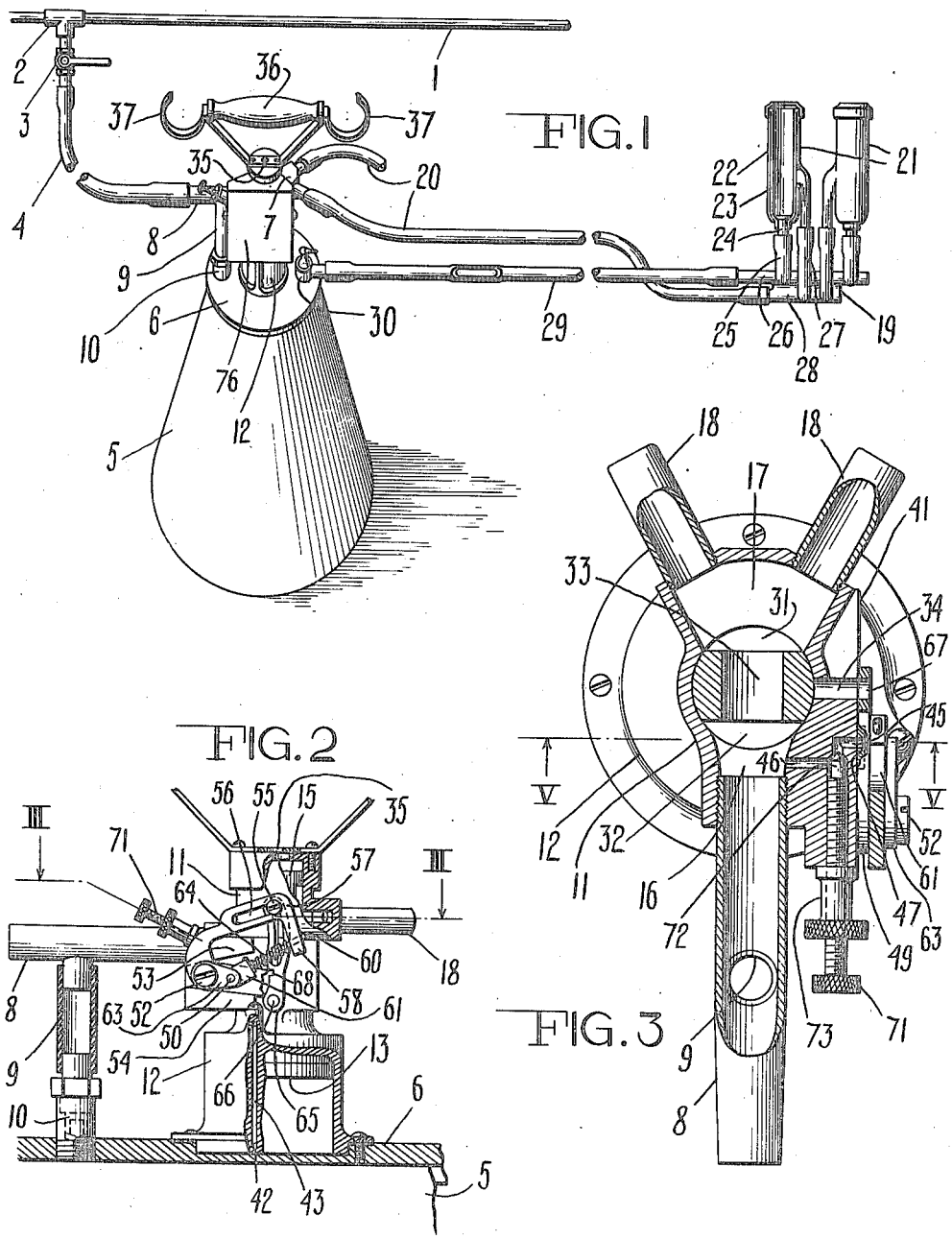

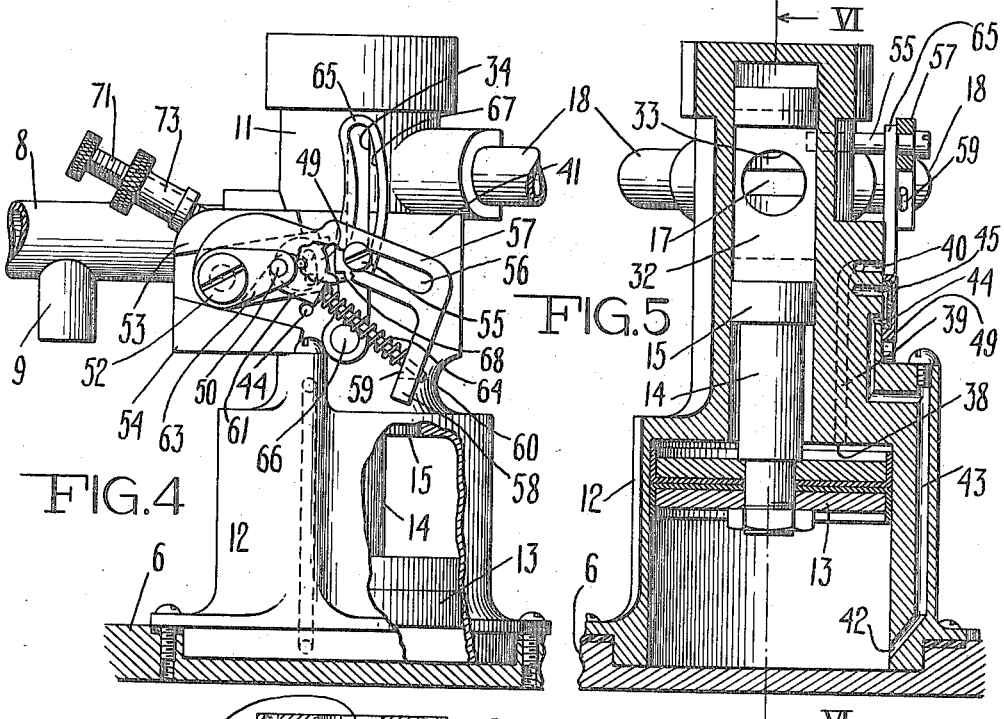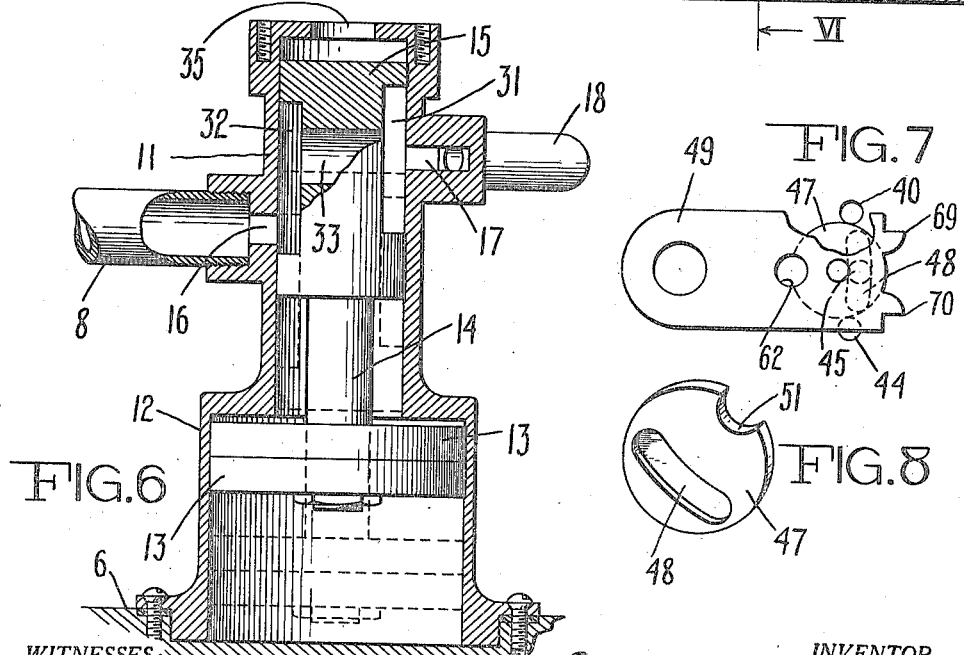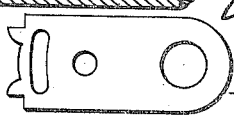

ARTHUR CHICHESTER MACARTNEY, OF BLOOMFIELD, NEW JERSEY, ASSIGNOR TO EMPIRE CREAM SEPARATOR COMPANY, OF BLOOMFIELD, NEW JERSEY, A CORPORATION OF NEW JERSEY.

PULSATOR FOR MILKING-MACHINES.

1,270,429.  Specification of Letters Patent.  Patented June 25, 1918.

Application filed February 27, 1915. Serial No. 10,904.

*To all whom it may concern:*

Be it known that I, ARTHUR CHICHESTER MACARTNEY, a subject of the King of Great Britain, residing at Bloomfield, county of Essex, State of New Jersey, have invented certain new and useful Improvements in Pulsators for Milking-Machines, of which the following is a specification.

This invention relates to pulsators for milking machines of the type which operate automatically to alternately cut off and apply the vacuum or pressure to the teat cups of milking apparatus.

It has long been recognized in vacuum operated milking apparatus that continuous suction on the cow's teats was very injurious, and various means have therefore been provided for producing intermittent or pulsating action on the teats so as to relieve the same or restore them to their normal condition. For this purpose apparatus has heretofore been devised for automatically cutting off the vacuum at intervals, or for cutting off the vacuum and applying intermittent pressure to the teat, and my present invention relates to improved mechanism for effecting this result.

In the type of milking apparatus now in most general use a vacuum pipe having a continuous vacuum maintained therein extends through the stable, having connections at desired points for the attachment of the milking units, each milking unit or group of units having associated with it automatic valve mechanism for pulsating the vacuum for the teat cups of that particular unit or group. This automatic valve mechanism must be simple in construction, durable, positive and absolutely reliable in operation and preferably capable of adjustment so as to operate at the desired speed. My invention provides mechanism fulfilling all of these requirements.

In the accompanying drawings, which form a part of this specification, and in which I have illustrated one preferred embodiment of my invention, Figure 1 is a somewhat diagrammatic view of a milking unit showing one claw and a pair of teat cups connected therewith, one of the teat cups being shown in section. This view also shows a portion of the vacuum main to which the milking unit is connected.

Fig. 2 is a side elevation showing the pulsator mechanism and a part of the milk pail cover, portions of the pulsator mechanism being broken away to illustrate the interior construction.

Fig. 3 is a section on line III—III of Fig. 2 on a larger scale.

Fig. 4 is a side elevation of the pulsator mechanism showing the parts at the opposite end of the stroke from the position shown in Fig. 2, a part of the casing being broken away.

Fig. 5 is a vertical section on line V—V of Fig. 3.

Fig. 6 is a vertical section on line VI—VI of Fig. 5, the pulsator valve and its driving piston being drawn in full lines in the position shown in Figs. 2 and 5 and in dotted lines in position shown in Fig. 4.

Fig. 7 is an enlarged detail view of the valve carrier and control valve disk.

Fig. 8 is a detail perspective view of the control valve disk.

Fig. 9 is a detail view of a modified form of control valve in which the valve carrier and valve disk are made integral.

Referring to the drawings in detail, and particularly to Fig. 1, the numeral 1 designates a vacuum main extending through the stable in convenient location to the stalls, and in which a continuous vacuum is maintained by means of a suitable vacuum pump (not shown) or otherwise. At suitable intervals along this main are provided branch T's one of which is indicated at 2. The outlets from these T's are controlled by valves 3, and are adapted to have the milking units connected therewith by means of the flexible pipes 4.

In the preferred form of apparatus illustrated each milking unit comprises a pail 5, provided with a cover 6 upon which is mounted the pulsator mechanism 7. The flexible pipe 4 is connected to a pipe 8, which has a branch 9 leading directly to the interior of the milk pail, a check valve 10 (see Fig. 2) being preferably provided in this branch to prevent the inrush of air into the milk pail when the pipe 4 is disconnected from the vacuum main. The other branch of the pipe 8 leads directly to the pulsator valve casing 11 mounted on the milk pail cover (see Figs. 3 and 6). The lower part of this casing is enlarged as indicated at 12 to form a cylinder in which works a driving piston 13 which is connected by means of a piston rod 14 with the pulsator valve 15. Formed in the casing 11, preferably at a different level from the outlet port 16 which communicates with the pipe 8, is an inlet port 17 which communicates with one or more nipples 18, to which the teat cup claws 19 are connected by means of flexible pipes 20. (Fig. 1.) In the apparatus illustrated there are two nipples and two pipes 20, each of which is supposed to lead to a claw and set of teat cups, only one claw, however, being illustrated. Each claw carries the teat cups for a single cow, and each milking unit may be constructed to milk one or more cows simultaneously as desired. The particular apparatus shown is designed to milk two cows at a time.

In the construction illustrated the teat cups 21 (Fig. 1) are of the double chamber type, having an outer rigid casing 22 and an inner flexible lining or inflation 23. The inflation is connected through a nipple 24 and flexible brance pipe 25 with one manifold 26 of the claw, while the space between the teat cup casing and the inflation is connected by means of a flexible branch pipe 27 with a second manifold 28 of the claw. It is the manifold 28 which is connected by means of the pipe 20 to the pulsator valve casing, while the manifold 26 is connected by another flexible pipe 29 to the milk cock 30, mounted directly upon the milk pail cover 6.

When the apparatus is in use the milk cock 30 is open so that continuous suction from the milk pail is applied through the pipe 29, manifold 26, branch 25 and nipple 24 to the interior of the teat cup, this vacuum serving to draw the milk from the cow and carrying the same directly to the milk pail. The vacuum in the outer chamber of the teat cup, however, is pulsated by means of the pulsator valve mechanism to be hereinafter described, atmospheric pressure being admitted to such outer chamber alternately with the application of the vacuum thereto. This alternation of atmospheric pressure and vacuum causes the teat cup lining to alternately extend, so as to permit the milk to flow, and to collapse upon the teat so as to support and relieve the same thereby preventing congestion in the teat and permitting the milking operation to be carried on in a normal manner.

The particular construction and operation of the teat cup forms no part of my present invention and is shown and described merely by way of illustration. My pulsator valve mechanism is also applicable to other forms of milking apparatus utilizing a pulsated vacuum or pressure.

The pulsator mechanism proper which forms the subject of the present invention includes the casing, cylinder, valve and piston above referred to, and controlling means for reversing the pressure on the piston to cause the reciprocation of the piston and valve. The valve 15 is preferably cylindrical in form and has a sliding fit within the casing 11 and is provided with cutaway portions 31 and 32 upon opposite sides thereof, the two recesses thus formed being connected by a transverse passage 33. When the valve is in the upper position shown in Fig. 5 and in full lines in Fig. 6, communication is made from the pipe 8 and port 16 through the recess 32, passage 33 and recess 31 with the port 17, thereby placing the source of vacuum in direct communication with the outer chambers of the teat cups so as to distend the inflations thereof as above described.

When the valve 15 is moved to the opposite limit of its stroke, however, as indicated in dotted lines at Fig. 6, the top of the valve passes below the port 17, thereby cutting off communication of the same with the vacuum supply and opening the same to the atmospheric pressure which enters the valve casing freely above the valve through a hole 35 in the top of the casing. Upon the top of the casing is preferably mounted the usual handle 36 and the hooks 37 upon which to hang the claws and teat cups when the apparatus is being transported from place to place.

The reciprocation of the pulsator valve 15 is accomplished by means of the piston 13 upon the opposite sides of which the vacuum and atmospheric pressure are caused to act alternately. For this purpose the cylinder 12 is provided with a port 38 in its upper end (see Fig. 5) which is connected through a passage 39 with a port 40, formed in the face of a block or valve seat 41 attached to or formed upon the side of the valve casing 11. Another port 42 opening into the cylinder near the lower end thereof is connected by a passage 43 with a second port 44 formed in the valve seat 41. The valve seat has a third port 45 located between the ports 40 and 44, and connected by means of the passage 46 with the vacuum supply, it being shown in the particular embodiment of the invention illustrated as opening into the vacuum port 16. Suitable control valve mechanism is provided for connecting either one of the ports 40 and 44 with the central port 45 so as to admit the vacuum to one side or the other of the piston 13, the port which is not connected with the vacuum being at the same time opened to atmospheric pressure which acts to force the piston in one direction or the other as the case may be.

In the preferred form of apparatus illustrated in Figs. 1 to 8 the valve proper comprises a disk 47 which has a recess 48 therein and which slides in close contact with the face of the valve seat 41. This recess 48 is of such length as to connect the port 45 with one or the other of the ports 40 and 44. In Fig. 4 the valve is shown moved to its upper position in which port 40 is connected with port 45, while in Fig. 5 the opposite position of the valve is shown, port 44 being in communication with port 45.

The valve disk 47 is carried by the movable arm or valve carrier 49, it being preferably placed loosely in a recess therein, and being prevented from turning in said recess by a pin 50 (see Fig. 4) which engages a notch 51 in the side of the disk. The valve carrier 49 is pivoted on the pin 52 and is moved up and down by the mechanism to be hereinafter described, its movement being preferably limited by the stops 53 and 54 formed on the block or valve seat 41, as shown most clearly in Fig. 4.

The valve carrier and valve disk may be formed integral as shown in Fig. 9, but it is preferable to provide a separate valve member loosely mounted upon a carrier as described, as the latter construction insures a tight fit of the valve upon its seat at all times. This results from the fact that it is a vacuum valve, the vacuum tending to draw the valve to its seat.

My invention, however, does not comprise and is not limited to the use of this specific construction, and in the appended claims I merely refer to a control valve or valve member broadly, intending thereby to include either a two-part construction as shown in Figs. 1 to 8, or a unitary valve member as shown in Fig. 9, or other equivalent device.

The mechanism illustrated for operating the control valve is preferably constructed as follows:

Projecting from the side of the piston valve 15 through the slot 34 in the casing 11 is a pin 55, the end of which works in a slot 56 formed in a lever 57 which is pivoted at a suitable point, preferably upon the same pin 52 on which the valve carrier 49 is pivoted. This lever has an angularly projecting outer portion 58 in which is formed a hole 59. Through this hole projects one end of a spring-pressed rod or pitman 60, the head 61 of which is pivoted to the pin 50. One end of pin 50 fits in the hole 62 in the valve carrier 49 and also engages the notch 51 in the valve as above described, while the other end of the pin 50 is supported by an arm 63 pivoted upon the pin 52. Surrounding the rod or pitman 60 is a spring 64 which is compressed between the angular portion 58 of the lever 57 and the head 61 of the pitman. The reciprocatory movement of the piston valve 15 moves the pin 55 up and down in the slot 34 and causes the lever 57 to pivot about the pin 52. As the movement of the outer end of the pitman 60 which projects through the hole in this lever is greater than the movement of the inner end of the pitman pivoted to the valve carrier 49 it will be seen that the spring 64 pressing upon the head of the pitman will tend to force the pin 50 and the valve carrier first in one direction and then in the other as the axis of the pitman passes the line of the dead center through the pins 50 and 52. Fig. 4 shows the piston valve 15, pin 55 and lever 57 at the lower limit of the movement, the spring 64 acting upon the pitman having forced the valve carrier to the upper limit of movement in engagement with the stop 53. The valve 47 is now in its upper position and connects the port 45 with the port 40 so that the air is exhausted from above the piston 13 while the port 44 is open to the atmosphere permitting atmospheric pressure to act upon the under side of the piston 13. This causes the piston 13 and the piston valve 15 to move upward, thereby cutting off the port 17, which is connected with the outer chambers of the teat cups, from the atmosphere and connecting the same with the vacuum so as to exhaust the outer teat cup chambers.

The piston valve 15 moving upward carries with it the pin 55 and accordingly moves the lever 57 from the position shown in Fig. 4 to the position shown in Fig. 2. This causes the axis of the pitman to pass the dead center and the action of the spring 64 thereupon forces the valve carrier downward against the stop 54 as shown in Fig. 2. The port 40 is thereupon opened to the atmosphere permitting atmospheric pressure to act on top of the piston 13 while the port 44 is connected with the vacuum port 45 so as to exhaust the air from under the piston 13. This causes the parts to return to the position shown in Fig. 4, the cycle of operations described being automatically repeated as long as desired.

In order to insure the full stroke of the valve 15 without regard to variations in the frictional resistance to movement of the parts, or to the strength of the spring 64, I preferably provide locking means for preventing the movement of the valve carrier 49 until the piston valve 15 has actually reached the predetermined limit of its stroke. The form of this mechanism illustrated comprises a lock lever 65 pivoted to the block or valve seat 41 by pivot 66 and having a suitably shaped cam slot 67 formed in the upper end thereof, through which passes the pin 55. In the side of the lever 65 adjacent to the end of the valve carrier 49 is a notch 68 which is adapted to engage with one or the other of a pair of projections 69 and 70, formed upon the end of the valve carrier (see Figs. 4 and 7). The cam slot 67 is so shaped that the lock lever 65 is held over toward the end of the valve carrier so as to cause the notch 68 to engage one or the other of the projections on the valve carrier, except when the pin 55 is at one or the other of the limits of its movement, in which positions it moves the lock lever away from the valve carrier so as to disengage the projections thereon, and permit the valve carrier to be thrown or snapped over by the action of the pitman and spring 64.

Fig. 4 shows the parts at the limit of the stroke when the lock lever has been moved out of engagement with the valve carrier and the latter has just been pushed to its upper position. In the operation of the device the position of Fig. 4 will be followed immediately by the rise of the piston 13 and piston valve 15 and pin 55 which will bring the notch 68 into engagement with the projection 70, and thus lock the valve carrier in the position shown until the pin 55 reaches the upper end of the cam slot 67, as shown in Fig. 2, which marks the upper limit of movement of the piston valve 15. At this point the pitman 60 having moved past the dead center, the spring 64 tends to force the valve carrier to its down position, which action takes place as soon as the lock lever is moved far enough to release the projection 70.

In order to regulate the speed of action of the apparatus to that regarded as most satisfactory by the operator, or suited to the particular cow, being milked, I provide a regulating screw 71 which has a conical point 72 (see Fig. 3) which enters the passage 46 leading from the port 45 to the vacuum supply pipe, the adjustment of this screw serving to restrict this passage more or less as desired. A lock nut 73 is preferably provided for preventing accidental misplacement of the screw. The adjustment of the passage 46 as described obviously regulates the vacuum supply to the cylinder 12, and so controls the rate of movement of the piston 13 and valve 15.

The control valve and operating mechanism above described are preferably inclosed within a removable casing 76, as shown in Fig. 1, to keep the mechanism clean and to prevent breakage of, or injury to the parts.

From the foregoing it will be seen that I have provided pulsator mechanism which is positive and quick in operation, so that time is not wasted in the movement of the parts, but the maximum periods, both of suction and of rest for the teats are obtained, thereby making the apparatus efficient and economical in operation. At the same time the apparatus is so simple as to be capable of operation by an unskilled person, and will operate for long periods of time without necessitating repairs or adjustments.

The improvement in valve construction illustrated in Figs. 1 to 8 and consisting in the use of a valve carrier carrying a separate valve movable freely toward the valve seat so that it may be held in engagement with the latter by the action of the vacuum is not claimed herein, as this improvement forms a part of the subject matter claimed in the application of Robert Warnock, filed Aug. 7, 1915, Serial No. 44176. The specific improvement in the pulsator valve consisting in forming this valve with a central passage and with the cylindrical bearing portions adjacent to the valve casing slot and opposite thereto is also claimed in said Warnock application, and therefore is not claimed in this case. Certain features of construction illustrated herein relating particularly to the general construction and arrangement of the pulsator housing are also not claimed herein as these features are covered in my prior application for patent filed August 23, 1913, Serial No. 786,287.

While I have illustrated a preferred embodiment of my invention, it is to be understood that I do not limit myself to the specific features thereof any further than as specified in certain of the appended claims, but desire to cover the principle of my invention broadly and in the various applications of which it is susceptible.

Having thus described my invention, I claim:

1. In pulsator mechanism for milking apparatus, the combination of a pulsator valve, vacuum operated mechanism for reciprocating said valve, a control valve for controlling the action of the vacuum on said operating mechanism, a pivoted actuating member for said valve, a valve actuating lever having a spring connection with said valve actuating member and a separable movable member having a locking portion for preventing premature movement of said valve.

2. In a pulsator mechanism for milking apparatus, the combination of a pulsator valve, vacuum operated mechanism for reciprocating said valve, control valve devices for reversing the action of the vacuum on said operating mechanism, tumbler mechanism including a spiral spring adapted to be moved to one side or the other of a dead point for moving said control valve devices, said tumbler mechanism being actuated by the movements of said vacuum operated mechanism and a member actuated by the vacuum operated mechanism and independent of the control valve actuating tumbler mechanism for locking said control valve against movement until the pulsator valve has reached the predetermined limit of its stroke.

3. In pulsator mechanism for milking apparatus, the combination of a pulsator valve, vacuum operated means for reciprocating the same, a vacuum control valve for reversing the action of the vacuum on said operating means, tumbler mechanism actuated by the movements of said pulsator valve for moving said control valve, a locking lever having means to engage a part of said control valve mechanism for temporarily preventing movement thereof, said locking lever having a cam slot therein, and a member movable with said pulsator valve and working in said cam slot, said cam slot being of such shape that when the pulsator valve reaches either limit of its stroke, said lever will disengage said control valve mechanism to permit movement thereof.

4. In pulsator mechanism for milking apparatus, the combination of a casing, a pulsator valve mounted to reciprocate in said casing, vacuum operating means for reciprocating said pulsator valve, and control valve mechanism for controlling the action of the vacuum upon said operating means, said control valve mechanism comprising a block mounted upon said casing having a valve seat thereon, ports in said valve seat, a device pivoted to said block, a slotted lever pivoted to said block, a pin movable with said pulsator valve and working in said slot, and a spring pressed pitman pivoted at one end to said device and having its other end carried by said lever.

5. In pulsator mechanism for milking apparatus, the combination of a casing having a slot in the side thereof, a pulsator valve mounted to reciprocate in said casing, a cylinder, a piston working in said cylinder and operatively connected to said pulsator valve, means including a movable valve member for connecting said cylinder at one side or the other of said piston with a source of vacuum, a slotted lever pivoted to a fixed support, a pin carried by said pulsator valve and projecting through the slot in the side of said casing and through the slot in said lever, and a spring pressed pitman pivoted at one end to said valve member and having its other end carried by said slotted lever.

6. In pulsator mechanism for milking apparatus, the combination of a casing, a pulsator valve mounted to reciprocate in said casing, a cylinder, a piston working in said cylinder and operatively connected to said pulsator valve, means including a movable valve member pivoted to a fixed support for connecting said cylinder at one side or the other of said piston with a source of vacuum, a slotted lever, a pin carried by said pulsator valve and projecting through the slot in said lever, a spring pressed pitman pivoted at one end to said valve member and having its other end carried by said slotted lever, and locking mechanism for preventing the movement of said valve member until the pulsator valve has reached the predetermined limit of its stroke.

7. In pulsator mechanism for milking apparatus, the combination of a casing, a pulsator valve mounted to reciprocate in said casing, a cylinder, a piston working in said cylinder and operatively connected to said pulsator valve, means including a movable valve member for connecting said cylinder at one side or the other of said piston with a source of vacuum, a slotted lever, a pin movable with said pulsator valve and projecting through the slot in said lever, a spring pressed pitman pivoted at one end to said valve member and having its other end carried by said slotted lever, and locking mechanism for preventing the movement of said valve member until the pulsator valve has reached the predetermined limit of its stroke, said locking mechanism comprising a lock lever pivoted to a fixed support and having a cam slot therein through which the pin movable with the pulsator valve projects, said lock lever having a part engaging said valve member except when it is moved out of engagement with said valve member by the action of said pin in said cam slot.

8. In pulsator mechanism for milking apparatus, the combination of a casing, a pulsator valve reciprocating therein, vacuum operating mechanism for reciprocating said valve, and control valve mechanism for controlling the action of the vacuum on said operating mechanism, said control valve mechanism including a valve seat, a valve member sliding thereon, a lever pivoted to a fixed support and having a slot therein and having an arm at the outer end thereof with a hole therein, a pin carried by the pulsator valve and projecting through a slot in said casing and through the slot in said lever, a pitman having a head at one end pivoted to said valve member and having the other end projecting through the hole in said lever, and a coiled spring surrounding said pitman and compressed between the head thereof and the arm of said lever.

9. In pulsating mechanism for milking apparatus, the combination of pulsator valve mechanism, a vacuum operated piston, a control valve for controlling the action of the vacuum on said piston, a pivoted slotted operating lever for said control valve, a pivoted slotted locking lever for the control valve and a movable pin actuated by said piston passing through the slots of both said levers for operating the same.

10. In milking apparatus, the combination with a milk pail, and cover therefor, of a casing mounted on said cover and having a cylindrical bore in the lower end thereof and an upper cylindrical bore, a piston working in the lower cylindrical bore, a pulsator valve working in the upper cylindrical bore and connected to said piston, a vertical slot in the upper part of said casing, a pin carried by said pulsator valve and projecting through said slot, a reversing valve for alternately connecting the portions of the lower bore of said casing above and below said piston with the atmosphere and with a source of vacuum, and operating connections for said reversing valve engaging said pin.

11. In milking apparatus, the combination of a milk pail, a cover therefor, a valve casing mounted on said cover, a pulsator valve reciprocating vertically in said casing, automatic vacuum operating mechanism for reciprocating said valve, and a carrying handle for said milk pail and valve mechanism attached to the upper end of said valve casing.

12. In milking apparatus, the combination with a milk pail and cover therefor, of a casing mounted on said cover having concentric cylindrical bores therein with their axes vertical, the lower of said bores being larger than the upper one, a piston reciprocating in said larger bore, a pulsator valve reciprocating in said smaller bore and connected to said piston, a vacuum supply pipe connected to the upper portion of said casing, connection from teat cups to the upper portion of said casing, a block mounted on said casing and having a valve seat located in a vertical plane, said valve seat having a plurality of ports therein, at least one of which is connected to the vacuum supply, and others of which are connected to the lower bore in said casing near the top and bottom thereof, a valve member movable on said valve seat to place one or the other of the ports connected with the lower bore of the casing in communication with the vacuum port, a slotted lever pivoted to said block, a pin carried by said pulsator valve and projecting through a slot in the wall of the casing and through the slot in said lever, and a spring pressed pitman pivoted at one end to said valve member and having its other end carried by said slotted lever.

13. In pulsator mechanism for milking apparatus, the combination of a milk pail cover, a casing mounted thereon having bores therein, in one of which reciprocates a piston and in the other of which reciprocates a pulsator valve, said piston and pulsator valve being connected, the bore in which the piston reciprocates being closed at the bottom by a portion of said pail cover.

14. In apparatus of the character described, the combination with a milk pail of a cover therefor, a casing mounted thereon, a pulsator valve mounted in said casing, automatic vacuum operated mechanism for reciprocating said valve, a vacuum pipe leading to said casing, and a branch leading from said vacuum pipe to said milk pail cover, said branch including a flexible pipe section.

15. In pulsator mechanism for milking apparatus, the combination of a milk pail cover, a casing mounted thereon having vacuum operated power mechanism therein, said casing having a pulsator valve chamber therein above said power mechanism, a pulsator valve in said chamber adapted to be reciprocated by said power mechanism, a valve seat on said casing, a control valve movable on said valve seat, and connections on the upper portion of said casing, adjacent to said pulsator valve chamber for a vacuum supply pipe and a pipe adapted to lead to the outer chamber of a double chambered teat cup.

16. In pulsator mechanism for milking apparatus, the combination of a casing having a slot in the wall thereof and a seat thereon, a vacuum operated member movable in said casing, a pin carried by said member and projecting through said slot, a control valve movable on said seat, a pivoted member for moving said control valve, a pivoted slotted lever having yielding connection with said pivoted member, a second slotted lever adapted to engage a part movable with said valve to prevent premature movement thereof, the pin projecting through the slot in said casing passing through the slots in said levers and actuating the same.

17. In apparatus of the character described, the combination of a milk pail cover, a casing mounted thereon, vacuum operated mechanism in said casing, a vacuum pipe leading to said casing, a branch leading from said vacuum pipe to an opening in said milk pail cover, said branch including a flexible pipe section.

18. In apparatus of the character described, the combination of a milk pail cover, vacuum operated pulsator mechanism mounted theron, a check valve casing mounted on said cover, a vacuum connection leading to said pulsator mechanism and a branch leading from said vacuum connection to said check valve casing, said branch including a flexible pipe section.

In witness whereof I have hereunto set my hand in the presence of two subscribing witnesses.

ARTHUR CHICHESTER MACARTNEY.

Witnesses:
CHALMER T. MILLER,
JESSIE MAXWELL.